United States Patent [19]

Yang et al.

[11] Patent Number: 5,760,412
[45] Date of Patent: Jun. 2, 1998

[54] METHOD AND APPARATUS FOR SENSING THE PRESENCE OF A LINE OF DATA FROM A DOCUMENT ON A TRANSPARENT SURFACE

[75] Inventors: Chin-Sheng Yang; Wenhung Hsieh; Derek Tang, all of Hsinchu, Taiwan

[73] Assignee: Microtek International, Inc., Hsinchu, Taiwan

[21] Appl. No.: 601,613

[22] Filed: Feb. 14, 1996

[51] Int. Cl.$^6$ ............................................. G01N 21/86
[52] U.S. Cl. ......................... 250/559.4; 250/234; 358/488
[58] Field of Search ........................... 250/559.4, 559.39, 250/559.44, 234; 358/488, 486, 464, 455, 497; 382/319, 317; 355/75

[56] References Cited

U.S. PATENT DOCUMENTS

| | | | |
|---|---|---|---|
| 4,071,232 | 1/1978 | Fujimoto | 358/488 |
| 5,138,674 | 8/1992 | Sugawa | 382/319 |
| 5,568,281 | 10/1996 | Kochis et al. | 358/488 |

Primary Examiner—Que Le
Attorney, Agent, or Firm—Bacon & Thomas

[57] ABSTRACT

Apparatus and a method for sensing the presence of a document on the transparent surface of an optical scanner involve moving a scanner optics carriage to a predetermined position beneath the transparent surface, reading a line of data, and if any of the data is on the "white" side of the gray-scale relative to a threshold, determining that a document is present in the scanner. Optionally, before determining whether a document is present, the apparatus and method may perform an initial threshold comparison to check for the presence of a dark background to ensure that an old document has been removed before the new document is read. The results of the document presence determination are used to generate a signal which is sent through a scanner interface to the host computer for use in automatically initiating a complete scan of a new document.

17 Claims, 5 Drawing Sheets

METHOD AND APPARATUS FOR SENSING THE PRESENCE OF A LINE OF DATA FROM A DOCUMENT ON A TRANSPARENT SURFACE

BACKGROUND OF THE INVENTION

1. Field of the Invention

This invention relates to an automatic document sensing apparatus for use in an optical scanner, and to a method of automatically sensing a document positioned in an optical scanner. The invention also relates to firmware control of a scanner, and to a scanner control program, preferably embodied in firmware, which enables document sensing without the addition of mechanical, electrical, and/or optical sensors.

2. Discussion of Related Art

Automatic document sensing apparatus in the form of mechanical or electro-optical sensors are well-known in the art of document handling, and are used, for example, in optical scanners having automatic feed mechanisms. However, while scanners provided with automatic document feed mechanisms have been known to include document sensing mechanisms for initiating the document feed and scanning process, the sensors used in scanner automatic feed mechanisms are in general not suitable for use in scanners of the type requiring manual document positioning.

The present invention is especially suitable for use in the latter type of scanner, in which documents are manually positioned, one page at a time, on a glass surface prior to scanning, and the only way to signal the presence of a document and initiate scanning is to manually manipulate a key, lever, switch, button, or other device 1' on the scanner housing 1. While manual initiation of the scanning process is not difficult, any added step in preparing a document for scanning can be inconvenient in cases where multiple documents are to be scanned or the scanner is located at a remote location from the host computer.

An example of a commercially available scanner which includes a document sensing function is the PageWiz® scanner manufactured by MicroTek. This scanner uses an infrared sensor to detect a document and initiate a paper loading process. The initial detection occurs because the weight of the paper pushes the sensor block up to a position where the document is positioned between the sensor and a transmitter. While the PageWiz system is a user friendly system, the mechanical components, additional sensors, and electronics are complicated and would not be suitable for an arrangement in which the document is manually positioned directly on the sensor glass rather than automatically fed because 1.) it would be very difficult to place a discrete sensing mechanism on or near the glass surface, and 2.) the addition of such a mechanism would in any case greatly increase the cost and complexity of a scanner type whose principal advantages include simplicity and low cost.

FIGS. 1 and 2 show a typical optical scanner of the type with which the present invention is concerned, including a housing 1 and a lid 2 pivotally mounted at one end of a top surface of the housing. Lid 2 is arranged to cover a glass surface 3 on which a document to be scanned is placed face down, so that the document can be read by sensor elements which convert an image of the document into electronic form for transfer to a host computer for storage and/or processing. The sensor is typically a charge coupled device (CCD) 4 positioned within the housing and arranged to be at the focal point of optical scanning elements in the form of mirrors 5–7 and a lens 8 which direct light reflected from the document to the CCD.

While it is possible to capture an entire image using a fixed array of sensors and optical elements, in the typical scanner, for purposes of convenience, the optical elements and sensors are arranged to read a single line of the image at a time, with the optical elements and sensor being stepped relative to the document as each line is read. As shown in greater detail in FIG. 3, for example, the optical elements may be arranged on a movable carriage 9, illustrated as including a guide 9' arranged to move along guide rails (not shown), with illumination being provided by a lamp 10 arranged to move with the carriage. The image is thus formed as light from lamp 10 is reflected from portions of a document positioned on the glass and directed by mirrors 5–7 through a lens and/or filter 8 to the CCD 4.

To compensate for changes in the light source and/or the sensitivity of the CCD, it is conventional to include a calibration strip in the form of a white strip 3' placed around the edge of the glass surface. When not scanning, the carriage is normally positioned beneath the calibration strip, where it stays until a full scan is initiated.

The problem with this type of scanner, as indicated above, is that in order to begin document scanning after a document has been placed on the scanner, the operator must operate a switch, lever, or other device 1' to indicate that the document is in position ready for scanning and/or to initiate scanning. In the absence of such an action, the host computer has no way of determining whether the scanner is in fact ready to scan, and thus if the operator forgets to operate the scan initiation device, the scanning program will not work.

It is of course possible to determine whether a document is present by scanning the entire document into the host computer and then analyzing the results of the scan, but a complete scan takes time and results in a waste of computer resources. To the contrary, the current trend is to attempt to place as many of the scanner control functions in firmware built into the scanner, simplifying the software control requirements and also the operator interface. Therefore, while the ultimate goal of the invention is for the user to be able to simply place a document on the glass and have the scanner automatically scan the document without having to touch a scan key, it is also important to achieve the automated scanning in a manner which does not require additional sensors, and yet which can be achieved using firmware built into the scanner.

Although the invention is particular suitable for use in a scanner of the type illustrated in FIGS. 1–3, achieving automated document sensing using firmware which can be built into the scanner, it should nevertheless be appreciated that the invention does not need to be limited to the specific components illustrated in FIGS. 1–3. For example, automated document sensing without additional sensors could just as well be applied to scanners having an automatic feed mechanism, but in which the document is stationary during a scan, allowing the scan process to be synchronized with the automatic feed, and also permitting verification that the feed mechanism has properly positioned the document, without the need for additional mechanical or electromechanical sensing elements.

SUMMARY OF THE INVENTION

It is accordingly an objective of the invention to provide an apparatus and method for automatically sensing the presence of a document on a scanner, without operator intervention.

It is a further objective of the invention to provide an apparatus and method for automatically sensing the presence of a document on a scanner of the type in which the document is placed face down on a glass surface and an image of the document is captured one line at a time by optical elements positioned on a movable carriage below the glass surface.

It is a still further objective of the invention to provide an apparatus and method for automatically sensing the presence of a document on a scanner without the need for separate mechanical or electro-optical sensor components, using scanner optics already built into the scanner and control circuitry in the form of firmware built into the scanner.

It is yet another objective of the invention to provide an improved scanner having a document sensing function which eliminates the need for operator intervention following positioning of a document for scanning, and yet which does not require additional sensors or complex sensing electronics that would significantly add to the cost of the scanner, or increase the complexity of the host computer scanner control software and interface.

These objectives of the invention are achieved, in accordance with the principles of a preferred embodiment of the invention, by providing apparatus in the form of firmware, and a method embodied by program steps carried out by the firmware, for causing a scanner optics carriage to move to a predetermined position relative to a potential document, read a line prior to the initiation of a full scan, and compare the line of data thus read with the threshold to determine whether a document is present.

More particularly, the invention involves moving the scanner optics carriage to the predetermined position beneath a dark portion of the scanner lid, reading a line of data, and if any of the data is on the "white" side of the gray-scale relative to the threshold, determining that a document is present in the scanner. During this determination, the line of data read is first converted to digital values by the firmware and compared with a predetermined high-low value, e.g., 40 h. If the result of such comparison is lower than the predetermined threshold value, no new document is considered to be on the glass and the scanner keeps reading it every few mini-seconds until it gets data higher than the threshold.

In an especially preferred embodiment of the invention, two data readings and two threshold comparisons are made before a scan is initiated. The first comparison is to determine whether a document is not present, so as to ensure that the scanner is clear of old documents when the process is initiated, after which the above-mentioned test for the presence of a new document is carried out. In this preliminary step, the line of data read is first converted to digital values by the firmware and compared with a predetermined high-low value, e.g., 40 h. If the result of such comparison indicates that any of the data is higher than the predetermined threshold value (which can again be 40 h), an old document is considered to be on the glass and the scanner keeps reading it every few fractions of a second until all data is lower than the threshold.

By way of background, the value 40 h is the hexadecimal equivalent of the value 64 in an 8-bit grayscale system ranging from dark (0) to white (255 or FFh in hexadecimal code). Those skilled in the art will appreciate, however, that the invention is not to be limited to a particular grayscale system or threshold value. The level chosen as the threshold can, depending on such factors as the types of documents to be scanned and the color of the background, be freely varied so long as the threshold is between the background level and the level of at least a portion of the document.

The above-described steps depend in part on the color of the inside of the upper cover of the scanner, which is set to black in the preferred embodiment of the invention. If there is no document on the glass, the inside of the upper cover will be seen through the glass. Since the inside of the upper cover is black, the first data from a reading will be less than the threshold. If no new document is placed on the scanner, the second reading will also be lower than the threshold, and a no new document signal will be generated. If there is a document on the glass before beginning the sensing process, or the previous document has not been removed from the glass, the auto scan will not start and the process will stay in the first loop due to the fact the data is always above the threshold.

The final aspect of the invention is its relation to the overall scan process. In general, the invention works with a host computer connected to the scanner through an appropriate two-way data interface, such as a SCSI interface, which also permits transmission of control signals or bits. The output of the document sensing firmware is preferably in the form of a control bit, referred to as a flag, having a document present value and a no document value. In the preferred embodiment of the invention, the flag is initially clear, indicating the lack of a new document, until both threshold comparisons are made. The host computer reads this flag periodically during execution of the scanner control program, and uses the result to determine when to initiate a data transfer.

DETAILED DESCRIPTION OF THE PREFERRED EMBODIMENTS

Figure 1:
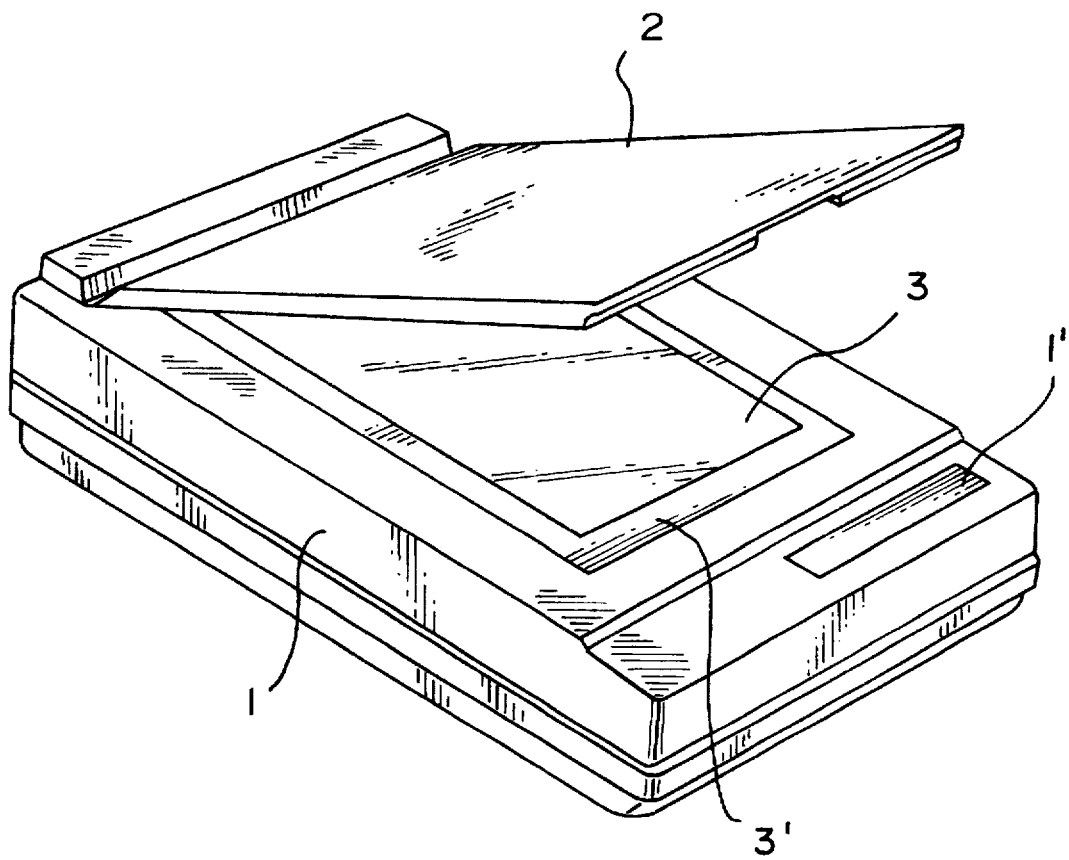
FIG. 1 is a perspective view of an optical scanner suitable for use with the document sensing apparatus and method of the preferred embodiment of the invention.
Figure 2:
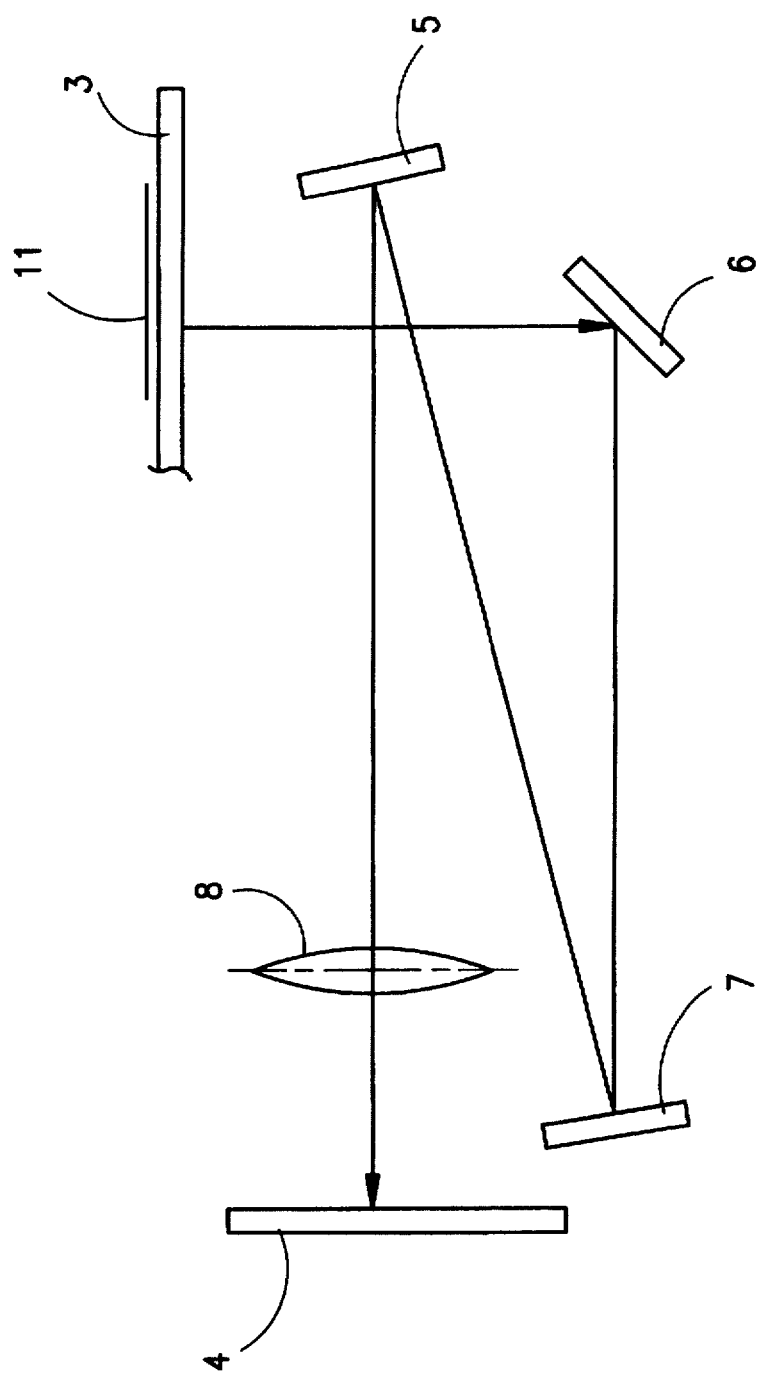
FIG. 2 is a schematic diagram of the principal optical components of the scanner illustrated in FIG. 1.
Figure 3:
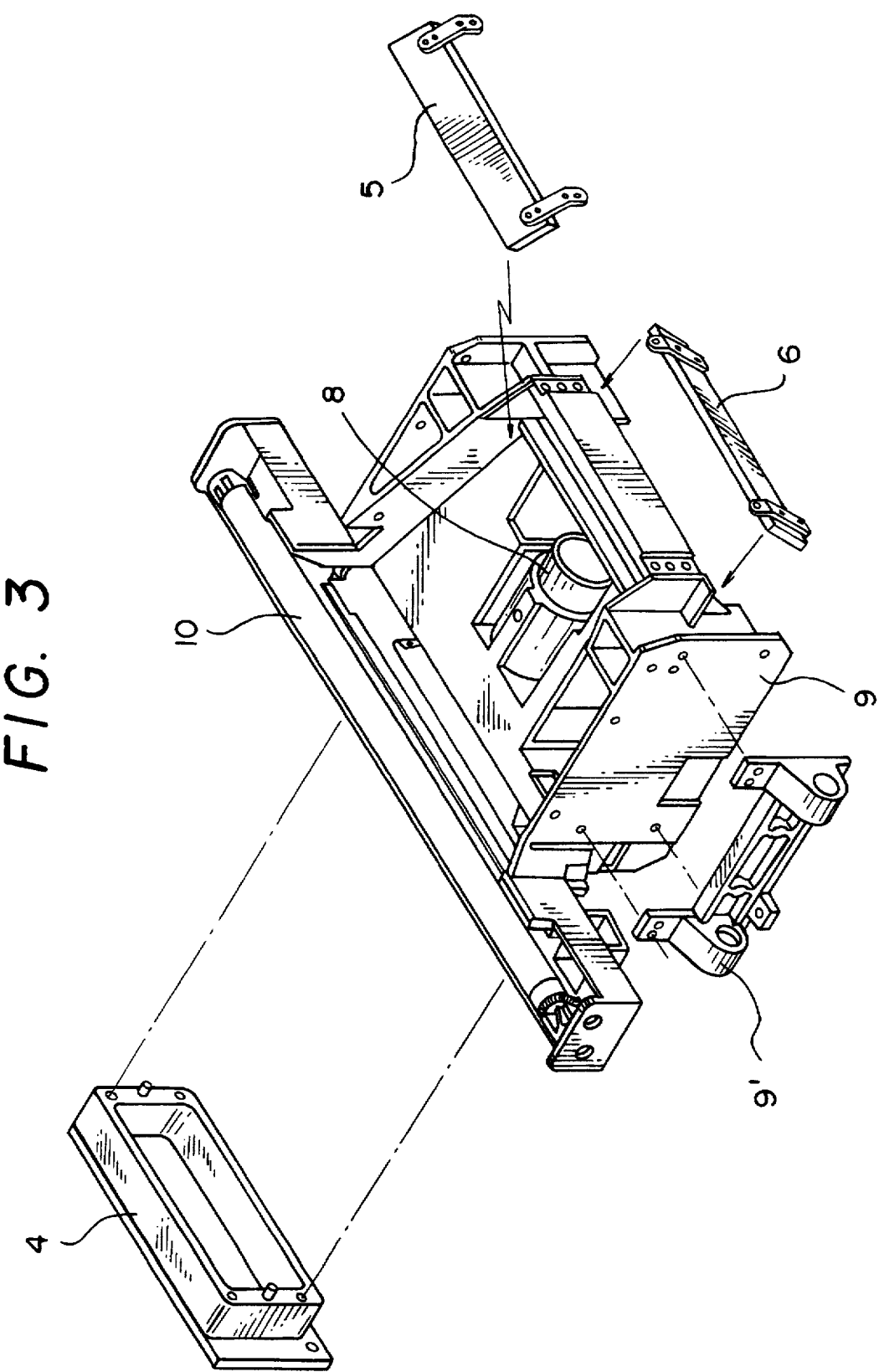
FIG. 3 is a perspective view showing details of the optical components illustrated in FIG. 2 and a carriage therefor.

The preferred embodiment of the invention is implemented on a scanner of the type illustrated in FIGS. 1–3, although it should be appreciated by those skilled in the art that the details of the scanner housing, optics, and carriage, are not critical to operation of the invention, and that the principles of the invention may be applied to a variety of scanner configurations.

The critical elements of the invention are a transparent surface on which the document is positioned for scanning, represented by glass surface 3 illustrated in FIGS. 1 and 2, scanner optics capable of reading a lines of data, represented by but not limited to mirrors 5–7, lens and/or filter 8, and CCD 4, illustrated in FIGS. 2 and 3, and means for positioning the scanner optics so as to read a line of data, represented by carriage 9 illustrated in FIG. 2. Preferably, the scanner to which the present invention is applied will include a lid corresponding to lid 2, although it is possible that the invention could be applied to a scanner without such a lid so long as background sensed by the CCD, absent a document, can be distinguished from a document by thresholding.

Preferably, the invention is implemented in the form of firmware, i.e., program instructions and data loaded in a class of memory that cannot be dynamically modified during processing. The memory can be in the form of a read-only memory, an electrically programmable memory (EPROM or EEPROM), custom circuitry, or other means of storing control information, together with registers and the like for storing and transferring data used by the firmware. In general, details of the firmware in question will be easily implemented by those skilled in the art once the basic principles of operation described in detail below are understood, particularly since it is conventional to include firmware in optical scanners for the purpose of controlling the main scanning operation, and the present invention can therefore use, with simple modifications, existing firmware and circuitry for moving the scanner carriage and causing the scanner optics to read a line of data. As indicated above, it is a trend to place more and more scanner control functions in the form of firmware, although automated document sensing has not previously been recognized as one of the scanner control functions that can be implemented in the form of firmware.

Figure 4:
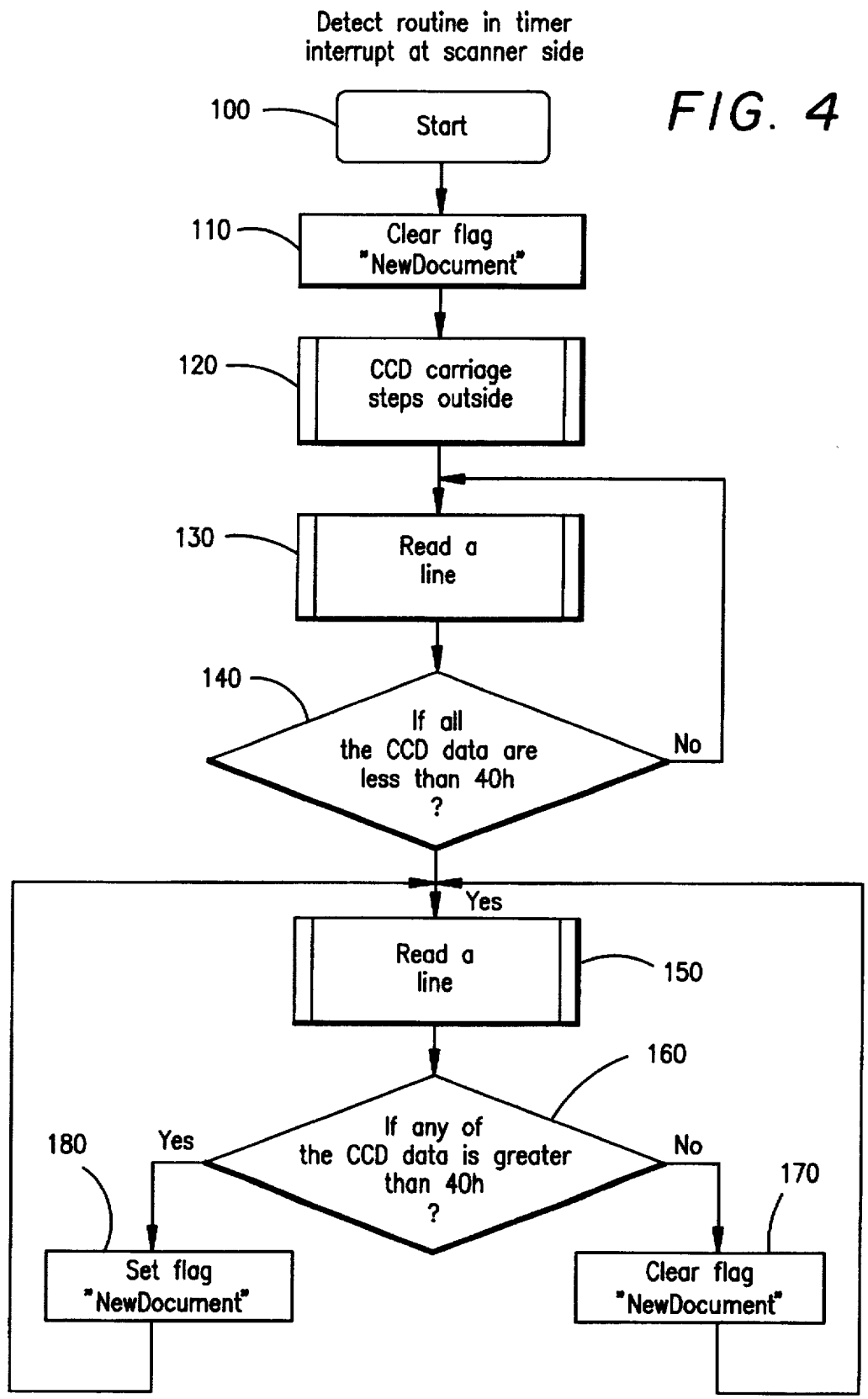
FIG. 4 is a flowchart of the document sensing method of a preferred embodiment of the invention.

A flowchart of the basic document sensing process to be implemented in the form of firmware as indicated above is illustrated in FIG. 4. The document sensing method begins upon power up, or upon receipt of a ready signal or other indication of readiness, as indicated by the "Start" symbol in the flowchart (step 100). In this embodiment of the invention, the document detection routine makes use of a flag "NewDocument" to indicate whether a document has been sensed, the status of this flag being checked by a host during the scanning process. This flag is initially cleared (step 110) and stays cleared until a two step document sensing routine is completed.

The carriage which moves the scanner optics into position beneath the document is initially positioned beneath the white border of the glass area. As a result, the sensor carriage (step 120) must be moved outside the boundaries of the white border so that the scanner optics are positioned under a portion of the glass where a document would be placed and a portion of the document can be sensed. It will of course be appreciated that the particular area sensed can be varied, and that it may also be possible to try different areas during a single sensing operation to accommodate different scanning positions or shapes and sizes of document, although most scanners have one area which will be covered whenever a document is placed on the glass regardless of the size or shape of the document.

Upon moving the carriage outside of the white border area, it is important that a contrast be provided so that the scanner can recognize that a document is not present, which is why the lower side of the lid is preferably a black color, so that the same result will be obtained whether the lid is opened or closed, and so that the lid will contrast with the lighter color of the paper use in documents to be sensed. During the document scanning process, if all of the data is within the range of a black background, then it means that no document present. The control routine can then wait for a document to be placed on the glass, after which scanning is initiated.

The first step after movement of the carriage into the predetermined position is to begin reading lines of data (step 130) and comparing the level, conventionally a grayscale value, of the received data with a predetermined threshold somewhere between white and black (step 140). The level chosen as the threshold should be dark enough to accommodate a variety of different types of documents, but light enough to distinguish the black background. For example, a suitable level could be grayscale 64 (40 h in hexadecimal code).

At this point in the control routine, if the grayscale level of the line is greater than the threshold, it means that the sensor is not picking out the black background provided by the cover, or at least is not sensing the absence of a document, which means that an old document must be present on the glass. Thus, if any of the data is greater than the threshold, the control routine returns to step 130, i.e., it initiates another read process after waiting a suitable period of time, and repeats the comparison until all of the data read is less than the threshold, indicating that the document has been removed. The period of time that the read is repeated can be varied, but should of course be short enough that an old document cannot be replaced by a new document before a second comparison takes place, and thus the wait time should not be greater than a few milliseconds.

Once the control routine has determined that the scanner is ready to receive a new document, based on the result of the first thresholding, then another line of data is read (step 150) and the scanner seeks to determine whether a document is present on the glass by comparing the data read with a second threshold (step 160).

In the illustrated embodiment, the second threshold is the same as the first threshold, i.e., 40 h, although it is within the scope of the invention to vary the second threshold. Rather than seeking to determine whether all of the data is below the threshold, as in the first comparison, however, the second comparison seeks to determine whether any of the data is above the threshold. While this is simply the negative of the original determination, and can be implemented using exactly the same subroutine, the results of the determination are that if none of the data is greater than the threshold, the routine clears the "NewDocument" flag is it has previous been set to indicate the presence of a new document (step 170) and returns to the beginning of the new document detection portion of the routine, while if any of the data is greater than the threshold, the "NewDocument" flag is set (step 180) and the routine then checks for the absence of a document.

Those skilled in the art will appreciate that, in the case where the first and second thresholds are the same, the routine can return from step 180 to step 150 since, as soon as the document is removed, the loop will switch from step 180 to step 170 and the "NewDocument" flag will be cleared, which is the same effect as returning to step 130.

Figure 5:
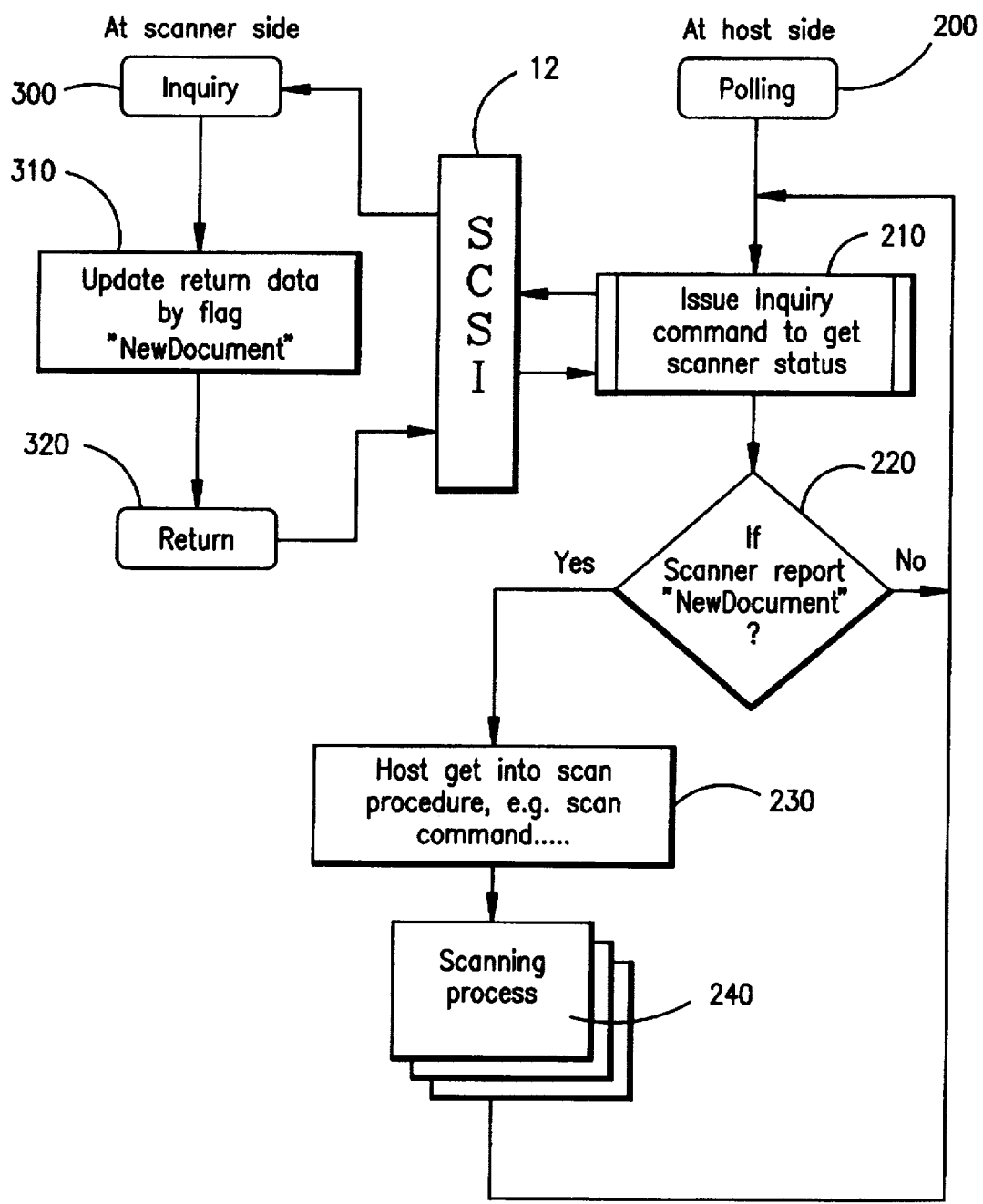
FIG. 5 is a flowchart of the overall scanning initiation process of the preferred embodiment of the invention.

Turning to FIG. 5, which illustrates the scanner as being connected to the host computer via a SCSI interface, although those skilled in the art will appreciate that other interfaces, such as a parallel interface, could be used, the "NewDocument" flag may be used by the scanner and host computer, as follows: On the host side, after the operator begins the scanner program, polling is initiated by the host program (step 200) and the host periodically polls the scanner by issuing an inquiry to the scanner (step 210) to obtain the scanner status. In the case where the scanner is connected to the host computer by a SCSI interface 12, the inquiry simply checks the appropriate pin on the interface for presence of a voltage on the pin (step 220), the presence or absence of the voltage indicating the status of the "NewDocument" flag. If the "NewDocument" flag is set, the host issues a scan command (step 230) and then proceeds through the normal scanning routine (step 240). If the "NewDocument" flag is clear, or the scanning process has been completed, the host control routine returns to the beginning of the loop in order to begin polling for a new document.

On the scanner side, as illustrated in FIG. 5, the presence of a signal on an interrupt line of the SCSI interface may be used to initiate the document scanning process, beginning with step 100, or simply to cause the results of steps 170 and 180, i.e., the contents of the "NewDocument" flag, which could simply be the output of a comparator or register, to be forwarded to the interface. For purposes of illustration, the scanner side steps are labelled inquiry (step 300), update (step 310), and return (step 320). It will be appreciated by those skilled in the art that additional steps may be required where the interface is, for example, a parallel interface.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

We claim:

1. In an optical scanner including a transparent surface on which a document is placed for scanning, a carriage, carriage positioning means for causing the carriage to be moved relative to the document, and reading means for capturing an image of the document by capturing light reflected from the document through the surface, the improvement comprising:

means for causing the carriage positioning means, prior to initiation of a full scan in which said image of the document is captured, to position the carriage at a location at which a line of data from the document can be read when the document is placed on the surface;

comparison means for comparing, with a threshold, data read by said reading means after said carriage has been positioned at said location by said carriage positioning means and prior to initiation of a full scan to determine whether the document is present on the surface;

means for generating, based on a result of said threshold determination, a signal indicative of the presence of the document on the glass, and means for initiating a full scan of the document if the signal indicates the presence of the document on the surface.

2. Apparatus as claimed in claim 1, wherein said document is a document which has been newly placed on said surface, wherein a previous document has been placed on said surface before said new document, and further comprising means for making an initial determination as to whether said previous document is present on said surface, and for causing said comparison means to determine whether said document is present on the surface only after said previous document has initially been determined to be absent from the surface.

3. Apparatus as claimed in claim 2, further comprising a pivotal cover having a gray-scale value distinguishable from a gray-scale value of a document.

4. Apparatus as claimed in claim 3, wherein said means for making an initial determination as to whether a document is not present on said surface comprises means for comparing a line of data with a second threshold, and determining that a document is not present if all data in said line of data is less than said second threshold.

5. Apparatus as claimed in claim 4, wherein the first threshold is equal to said second threshold.

6. Apparatus as claimed in claim 5, wherein said data is eight-bit gray-scale data, and said first and second thresholds have a value of hexadecimal 40 h.

7. Apparatus as claimed in claim 1, further comprising a pivotal cover having a gray-scale value distinguishable from a gray-scale value of a document.

8. Apparatus as claimed in claim 7, wherein a portion of said pivotal cover is black.

9. Apparatus as claimed in claim 1, further comprising an interface for connecting the scanner to host computer, and further comprising means for transferring said signal to said host computer upon receiving a status inquiry from the host computer, in order to automatically inform the host computer that a document is in position and that scanning may therefore begin.

10. Apparatus as claimed in claim 9, wherein said interface is a SCSI interface.

11. A method of sensing the presence of a document positioned for optical scanning on a transparent surface of a scanner, comprising the steps of:

moving an optical sensing device into a document reading position before initiation of a full-scan of said document;

reading a line of data;

comparing a grayscale level of the line read by the optical sensor with a threshold after said optical sensing device has been moved into said document reading position; generating a signal indicative of the presence of a document on the surface depending on a result of said comparing step, and initiating said full-scan if a document is determined to be present on said surface.

12. A method as claimed in claim 11, wherein the signal generating step comprises the step of generating said signal if a result of said comparison is that the gray scale level of the line read is greater than said threshold.

13. A method as claimed in claim 11, wherein said document is a document which has been newly placed on said surface, wherein a previous document has been placed on said surface before said new document, and further comprising the steps of making an initial determination as to whether said previous document is present on said surface, and causing the step of comparing the gray-scale level of the line of data with a threshold to occur only after said previous document has initially been determined to be absent from the surface.

14. A method as claimed in claim 13, wherein the step of making an initial determination as to whether a document is not present on said surface comprises the step of comparing a line of data with a second threshold, and determining that a document is not present if all data in said line of data is less than said second threshold.

15. A method as claimed in claim 14, wherein the first threshold is equal to said second threshold.

16. A method as claimed in claim 15, wherein said data is eight-bit gray-scale data, and said first and second thresholds have a value of hexadecimal 40 h.

17. A method as claimed in claim 1, wherein the scanner is connected to a host computer via an interface, and further comprising the step of transferring said signal to said host computer upon receiving a status inquiry from the host computer, in order to automatically inform the host computer that a document is in position and that scanning may therefore begin.

\* \* \* \* \*